United States Patent [19]

Beach

[11] 3,856,456

[45] Dec. 24, 1974

[54] DEAD BULB SENSING MECHANISM

[75] Inventor: David Easton Beach, Penfield, N.Y.

[73] Assignee: Eastman Kodak Company, Rochester, N.Y.

[22] Filed: Oct. 3, 1973

[21] Appl. No.: 402,954

[52] U.S. Cl. ............................. 431/92, 354/142
[51] Int. Cl. ............................................ F21k 5/02
[58] Field of Search .............. 431/92, 93; 354/142

[56] References Cited
UNITED STATES PATENTS

| | | | |
|---|---|---|---|
| 3,588,300 | 6/1971 | Sturn | 431/93 |
| 3,589,849 | 6/1971 | Sturn et al. | 431/93 |
| 3,602,618 | 8/1971 | Wichatek | 431/93 |
| 3,624,726 | 11/1971 | Horton | 95/11 |
| 3,630,129 | 12/1971 | Gow et al. | 431/93 |
| 3,630,131 | 12/1971 | Harvey | 354/142 |
| 3,661,063 | 5/1972 | Beach | 95/11.5 |
| 3,675,565 | 7/1972 | Pagel | 95/11 L |

*Primary Examiner*—Carroll B. Dority, Jr.
*Attorney, Agent, or Firm*—R. F. Brothers

[57] ABSTRACT

A sensing and firing mechanism for use with percussively ignitable flashlamps in a multilamp unit or flashcube includes a mechanism for withdrawing a flashlamp sensing and actuating member from the flash unit during rotation of the flash unit. The sensing and actuating member is movable into the flash unit to sequentially sense the condition of and to fire a flashlamp in the flash unit. The withdrawing mechanism includes a cam surface on the flash unit receiving socket which cams the sensing and actuating member out of the flash unit during manual rotation and a lever, responsive to movement of the film advance mechanism, which withdraws the sensing and actuating member from the flash unit when the socket is rotated during film advancement.

9 Claims, 7 Drawing Figures

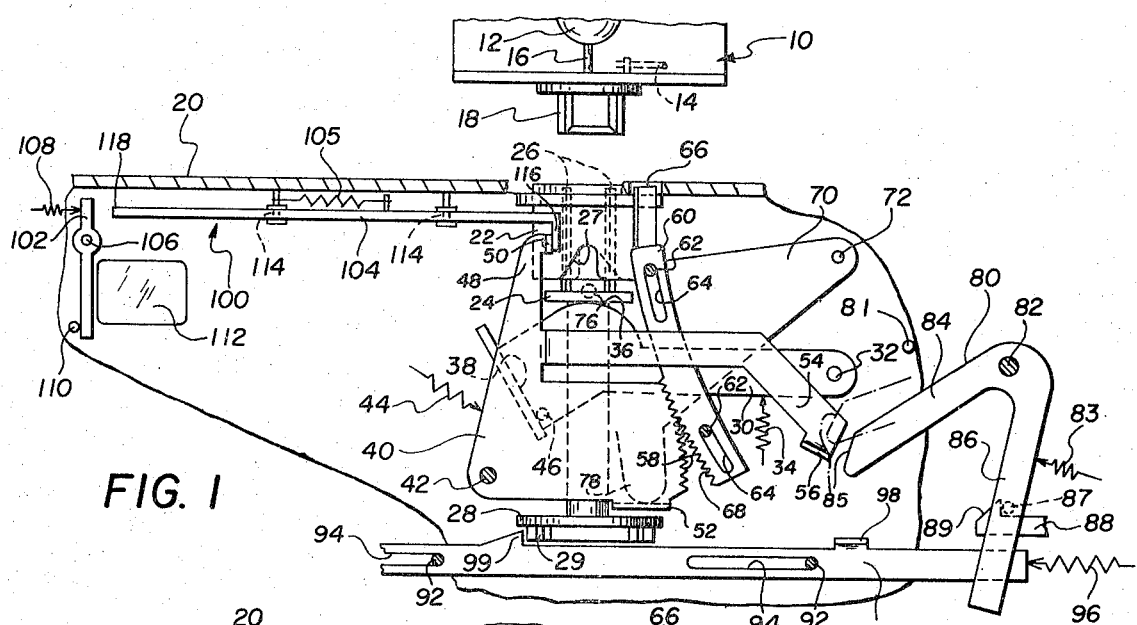

PATENTED DEC 24 1974

DEAD BULB SENSING MECHANISM

BACKGROUND OF THE INVENTION

1. Field of the Invention

The present invention relates to photographic cameras usable with percussively fireable flashlamps and more particularly to a mechanism within such a camera for sensing the condition of a precussively fireable flashlamp.

2. Description of the Prior Art

The use of percussively ignitable flash units is now well known in the photographic arts. In one form, a plurality of percussively fireable flashlamps are jointed into a multilamp flash unit, with each lamp having a pre-energized striker releasable from a stressed position to effect firing of the flashlamp. Cameras adapted to receive such a multilamp flash unit have been provided with mechanical means for sensing the operative or inoperative condition of one of the lamps and for firing an operative lamp. One such mechanism is disclosed in U.S. Pat. No. 3,588,300. That mechanism provides an instant dead bulb signal by moving a sensing member into non-releasing contact with a pre-energized striker in response to insertion of the flash unit in the camera socket. In the absence of a pre-energized striker, the sensing member actuates a dead bulb signal visible within the viewfinder of the camera. When such a signal is present, the operator may manually rotate the multilamp unit to place an unfired flashlamp in firing position, with consequent rotation of the camera socket. Moreover, the camera socket is automatically indexed in response to actuation of the film advance mechanism or other known camera mechanisms to place an unfired flashlamp in firing position. Since the sensing member is inserted through an access opening in the flash unit whenever the unit is coupled to the socket, it is necessary to withdraw the sensing member during rotation of the socket and flash unit. Withdrawal is achieved in the mechanism disclosed in U.S. Pat. No. 3,588,300 by means of a cam surface on the camera socket, which engages a cam follower coupled to the sensing member to cause the sensing member to be withdrawn from the access opening during rotation of the socket. During withdrawal, sufficient force must be imparted to the cam follower to overcome the inertia of the sensing member, the force biasing the sensing member into its sensing position and any other forces which impede movement of the sensing member. It has been found that excessive wear may occur on the cam surface and cam follower due to these forces when the camming structure is relied upon to withdraw the sensing member during each rotation of the camera socket.

SUMMARY OF THE INVENTION

It is therefore an object of the present invention to provide an improved mechanism for sensing the operability of a percussively fireable flash unit;

Another object of the present invention is to provide such an improved mechanism which instantly senses the operability of a flashlamp when the flash unit is coupled to the camera and which includes an improved mechanism for withdrawing the sensing member from the flash unit to permit indexing;

Another object of the present invention is to provide such an improved mechanism in which withdrawal of the sensing member during socket indexing is achieved in response to actuation of the film advance mechanism;

Another object of the present invention is to provide such an improved mechanism which includes a member, movable in response to actuation of the film advance mechanism, for withdrawing the sensing member during socket indexing and which includes a camming mechanism for withdrawing the sensing member during manual rotation of the socket.

These and other objects are achieved according to the present invention by a camera which is provided with a mechanism for sensing and actuating a percussively ignitable flashlamp having a pre-energized striker releasable to effect firing of the flashlamp. The sensing and actuating mechanism includes a sensing member that is movable into a sensing position in non-releasing contact with a striker in response to insertion of a multilamp flash unit in the camera socket and which further moves to a dead bulb indicating position when no pre-energized striker is positioned in its path of movement. To permit manual rotation of the multilamp flash unit by the operator, the camera socket is provided with a cam surface which is engageable with a cam follower on a cam lever. Engagement of the cam surface and follower causes movement of the sensing member out of the flash unit in response to manual rotation of the camera socket. In addition, the mechanism is provided with a lever which is engageable by the film advance mechanism during its operative movement to effect withdrawal of the sensing member from the flash unit during the indexing rotation of the camera socket which occurs in response to movement of the film advance mechanism.

BRIEF DESCRIPTION OF THE DRAWINGS

FIG. 1 is a front view of a portion of a camera incorporating the flash unit sensing and actuating mechanism of the present invention with a flash unit positioned for coupling to the camera socket;

FIG. 2 illustrates the camera of FIG. 1 with the flash unit coupled to the camera socket;

FIG. 3 illustrates the camera of FIG. 1 after firing of the flashlamp located at the firing site;

DESCRIPTION OF THE PREFERRED EMBODIMENT

Figure 4:
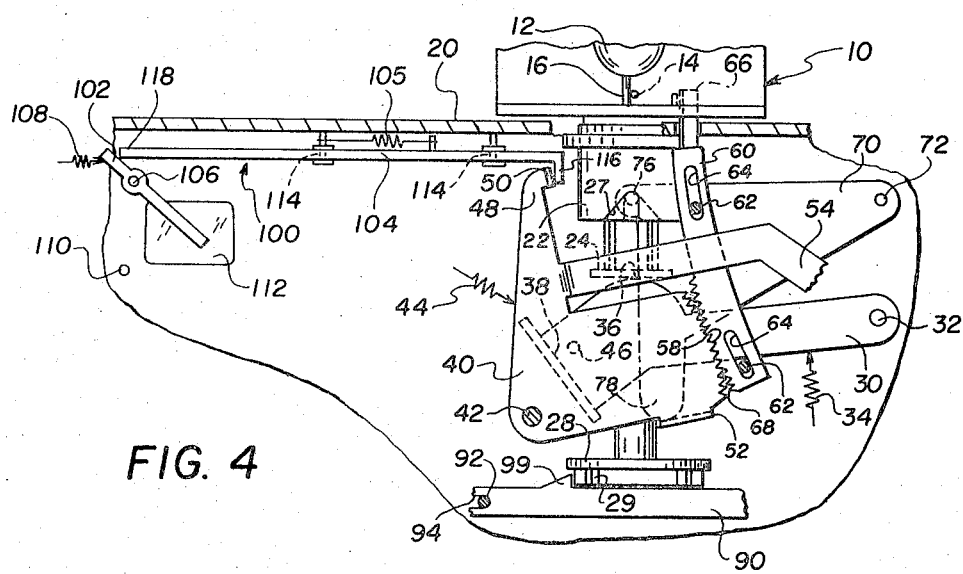
FIG. 4 illustrates the dead bulb signal indication when a pre-energized striker is not positioned in the firing position.

Because photographic apparatus is well known, the present description will be directed in particular to elements forming part of, or cooperating more directly with, the present invention. Camera elements not specifically shown or described herein are understood to be selectable from those known in the art.

In FIG. 1, photographic apparatus according to this invention is illustrated which is adapted for use with a multilamp flash unit, shown generally as 10, which is of the type known in the art. Flash unit 10 consists of a plurality of individual flashlamps 12, each of which has associated with it a pre-energized striker 14 which is releasable to strike against a primer 16 associated with each flashlamp 12. Striking of primer 16 by a released pre-energized striker 14 results in ignition of flashlamp 12 and the generation of artificial light. Flash unit 10 further includes a base 18 for releasably mounting flash unit 10 in a flash socket associated with the camera.

The photographic camera comprises a camera body 20 in which are mounted the various mechanisms which are to be described in detail below, including: a camera socket 22, a control lever 30, a sensing lever 40, a sensing and actuating slide 60, a cam lever 70, a flash actuating lever 80, a film advance slide 90, and a dead bulb signal mechanism 100. Socket 22 is adapted to releasably receive and hold base 18 of flash unit 10. Socket 22 further has associated with it a socket ring 24 which is movable along the axis of socket 22 and which has arms 26 that extend upwardly into a position in the path of movement of a flash unit 10 which is being coupled to socket 22. Engagement of arms 26 by a flash unit 10 will cause downward movement of arms 26 and socket ring 24. Socket 22 further has associated with it a cam surface 27 and an indexing base 28 with indexing lugs 29.

Control lever 30 is mounted on a pin 32, fixed within the camera, and is biased in a clockwise direction by a spring 34. Control lever 30 includes a cam surface 36 engageable with socket ring 24 and a cam surface 38. Movement of socket ring 24 downwardly as a flash unit 10 is coupled to socket 22 will cause counterclockwise rotation of control lever 30 by engagement of cam surface 36 with socket ring 24.

Sensing lever 40 is mounted on a pin 42, fixed within the camera, and is biased in a clockwise direction by a spring 44. Sensing lever 40 includes a cam follower 46 engageable by cam surface 38, a signal arm 48 terminating in a signal lug 50, a withdrawing lug 52, an actuating and withdrawing arm 54 which terminates in an actuating lug 56 and a sector gear 58. When no flash unit 10 is in socket 22, sensing lever 40 is biased, in a manner to be described hereinafter, so that cam follower 46 engages cam surface 38 with a force which is not sufficient to rotate sensing lever 40 against the bias of spring 34 on control lever 30 and spring 44.

Sensing and actuating slide 60 is movably mounted within the camera by pins 62 which extend through slots 64 in slide 60. Slide 60 is elongated in form and terminates in sensing and actuating end 66 and a sector gear 68 which meshes with sector gear 58.

Cam lever 70 is movably mounted on a pin 72, fixed within the camera. Cam lever 70 includes a cam follower 76 engageable with cam surface 27 and an arm 78 engageably with with-drawing lug 52 on sensing lever 40.

Actuating lever 80 is mounted on a pin 82, fixed within the camera, and is biased in a clockwise direction by a spring 83, for movement toward a stop 81, fixed within the camera. Actuating lever 80 includes an actuating arm 84 having a cam surface 85, a cocking arm 86 and a latching pin 87 engageable by a latch 88 having a cam surface 89. Latch 88 is movable in response to operation of a body release mechanism by the camera operator in any manner which is known in the art to release actuating lever 80 and cause actuation of a flashlamp 12.

Film advance slide 90 is movably mounted within the camera by means of pins 92 which extend through slots 94. Slide 90 is biased to the rest position illustrated in FIG. 1 by a spring 96. Slide 90 includes a cocking lug 98 and an indexing lug 99. Cocking lug 98 is engageable with cocking arm 86 of actuating lever 80 and indexing lug 99 is engageable with an indexing lug 29 on indexing base 28 of socket 22.

Signal mechanism 100 comprises a signal flag 102 and a signal arm 104. Signal flag 102 is mounted on a pin 106, fixed within the camera, and is biased in a clockwise direction by a spring 108 into a rest position in abutment with stop 110, wherein signal flag 102 is not visible within viewfinder 112. Signal arm 104 is an elongated slide which is movably held within the camera by pins 114 that extend through slots in signal arm 104 and is biased in a leftward direction by a spring 105. Signal arm 104 includes a sensing end 116 positioned for engagement with signal lug 50 on sensing lever 40 and a signal end 118 positioned for engagement with signal flag 102. Signal arm 104 is biased by spring 105 so that sensing end 116 is held in engagement with signal lug 50 and thereby biases sensing lever 40 so that cam follower 46 engages cam surface 38 when no flash unit is in socket 22. However, spring 105 is not strong enough to rotate sensing lever 40 against the bias of spring 34 on control lever 30 and spring 44.

As illustrated in FIG. 1, the camera mechanisms are positioned as they would be with no flash unit coupled to the camera. Socket ring 24 is held in its upward position by engagement with cam surface 36 on control lever 30 which is biased in a clockwise direction by spring 34. Cam surface 38 on control lever 30 engages cam follower 46 on sensing lever 40 and holds that lever in a position in which actuating lug 56 is not engageable by actuating arm 84 of actuating lever 80 as it rotates under the bias of spring 83 and signal lug 50 holds signal arm 104 out of engagement with signal flag 102. Furthermore, slide 60 is held within the camera by meshing of sector gears 58 and 68. Thus, the flash actuating and sensing mechanisms of the camera will not function during operation of the camera without a flash unit 10 coupled to camera socket 22.

FIG. 2 illustrates the camera mechanisms in the position they assume when a flash unit 10 is coupled to camera socket 22. Arms 26 engage the base of flash unit 10 and urge socket ring 24 in a downward direction as the flash unit is coupled to socket 22. Control lever 30 is rotated in a counterclockwise direction by engagement of socket ring 24 with cam surface 36, thereby freeing cam follower 46 from engagement by cam surface 38. Sensing lever 40 is freed to rotate about pin 42 under the bias of spring 105, which is sufficiently strong to overcome the counter bias of spring 44. Such rotation causes movement of sensing and actuating slide 60 in an upward direction by engagement of sector gears 58 and 68, until sensing and actuating end 66 comes into engagement with a pre-energized striker 14. Movement of sensing lever 40 also brings actuating lug 56 into a position wherein it is engageable by cam surface 85 on actuating arm 84. It may also be seen that signal lug 50 and signal arm 104 have both moved leftward under the bias of spring 105 but the amount of movement is not sufficient to actuate signal flag 102, since a pre-energized striker 14 is in position above slide 60 and has been sensed by sensing and actuating end 66. The camera is now in condition for flash operation by the operator.

As the operator depresses on the body release in a manner well known in the art, such movement is coupled to latch 88 and causes movement of latch 88 in proper synchronization with the shutter actuating mechanism of the camera to free actuating lever 80 for movement to a flash firing position under the urging of spring 83. Cam surfce 85 of actuating arm 84 engages actuation lug 56 on actuating and withdrawing arm 54 and causes counterclockwise rotation of sensing lever 40 about pin 42. Such movement is coupled through sector gears 58 and 68 to cause release of pre-energized striker 14 by means of sensing and actuating end 66 of slide 60. Actuating lever 80 continues to move to an uncocked position in abutment with stop 81. In so doing, cam surface 85 disengages from actuating lug 56, with sensing lever 40 continuing to move until the bias of spring 44 overcomes its inertial energy. Prior to that time, signal arm 104 will reach its leftward limit of travel when pins 114 engage the slot ends. Signal lug 50 will thus be disengaged from sensing end 116, permitting sensing lever 40 to be returned under the bias of spring 44 to the position illustrated in FIG. 3, in which the camera mechanisms are shown in the positions they assume after firing of a flashlamp 12. Actuating lever 80 has been moved to its uncocked position. Sensing lever 40 has been returned from its counterclockwise position under the bias of spring 44 so that actuating lug 56 moves past cam surface 85 into engagement with actuating arm 84, and signal lug 50 is engaged with sensing end 116.

The camera mechanisms may be prepared for subsequent operation of the camera by actuation of film advance slide 90. As the slide is moved to the right from its rest position, cocking lug 98 engages cocking arm 86 of actuating lever 80 and causes counterclockwise rotation of actuating lever 80 against the bias of spring 83 until latching pin 87 engages cam surface 89 on latch 88 and is latched behind latch 88. Simultaneously, indexing lug 99 engages one of the indexing lugs 29 on base 28 of camera socket 22 and causes rotation of camera socket 22 to bring an unfired flashlamp 12 into the camera firing position. During the initial movement of actuating lever 80 toward its cocked position, actuating arm 84 engages actuating lug 56 on actuating and withdrawing arm 54 and causes clockwise movement of sensing lever 40 about pin 42. Such movement permits cam follower 76 on cam lever 70 to move out of engagement with cam surface 27 and further is coupled by means of sector gears 58 and 68 to cause downward movement of sensing and actuating slide 60 out of the access opening in flash unit 10. Continued movement of actuating lever 80 disengages actuating arm 84 from lug 56, thereby permitting sensing and actuating slide 60 to be moved upwardly once more under the urging of sensing lever 40 as it moves in a counterclockwise direction under the urging of spring 105. Upward movement of slide 60 brings sensing and actuating end 66 into engagement with the bottom surface of flash unit 10, in position to enter the next access opening as its associated flashlamp is brought into firing position. Thus the sensing mechanism instantly senses the operability of each flashlamp as it is brought into firing position and indicates that condition in a manner which will now be described.

In the event that a pre-energized striker 14 is not in proper position within the flashlamp 12 which is in firing position, sensing and actuating slide 60 will move toward its extended position as illustrated in FIG. 4. Such movement is caused by the counterclockwise movement of sensing lever 40 under the urging of spring 105 and permits signal arm 104 to move to its signal position. Signal end 118 engages signal flag 102 and causes it to rotate in a counterclockwise direction into signaling position within the camera viewfinder. As the camera operator is aligning the object within the viewfinder in preparation for taking the next exposure, he will notice the signal flag indicating that a fired flashcube is in the firing position. He will now rotate the flash unit manually and sensing and actuating slide 60 must be withdrawn from the flash unit during such rotation.

Rotation of the flash unit causes rotation of socket 22, with cam follower 76 engaged by cam surface 27 on camera socket 22. Cam follower 76 will move downwardly, causing counterclockwise rotation of cam lever 70. As cam lever 70 rotates, arm 78 engages withdrawing lug 52 and causes clockwise rotation of sensing lever 40 which is transmitted by means of sector gears 58 and 68 to cause downward movement of sensing and actuating slide 60, thereby withdrawing sensing and actuating end 66 from the access opening in the flash unit during manual rotation of the flashcube. Rotation of sensing lever 40 also moves signal arm 104 out of engagement with signal flag 102, permitting signal flag 102 to move out of the viewfinder. As the next flashlamp moves into firing position, cam follower 76 moves upwardly with consequent resultant rotation of cam lever 70 and sensing lever 40. Movement of sensing lever 40 is coupled by sector gears 58 and 68 to cause sensing and actuating slide 60 to move upwardly, with sensing and actuating end 66 moving to sense the presence or absence of a pre-energized striker 14. It may thus be seen that the camera mechanism provides for insuring withdrawal of the sensing mechanism when the flash unit is being manually rotated by the operator. In addition, the mechanism provides for automatically withdrawing the sensing mechanism from the flash unit when the flash unit is being automatically indexed by operation of the camera mechanisms. The latter mechanism will operate to withdraw the sensing member prior to engagement of cam follower 76 by cam surface 27 on socket 22, thereby minimizing the stress and wear on cam follower 76 and cam surface 27.

Figure 5:
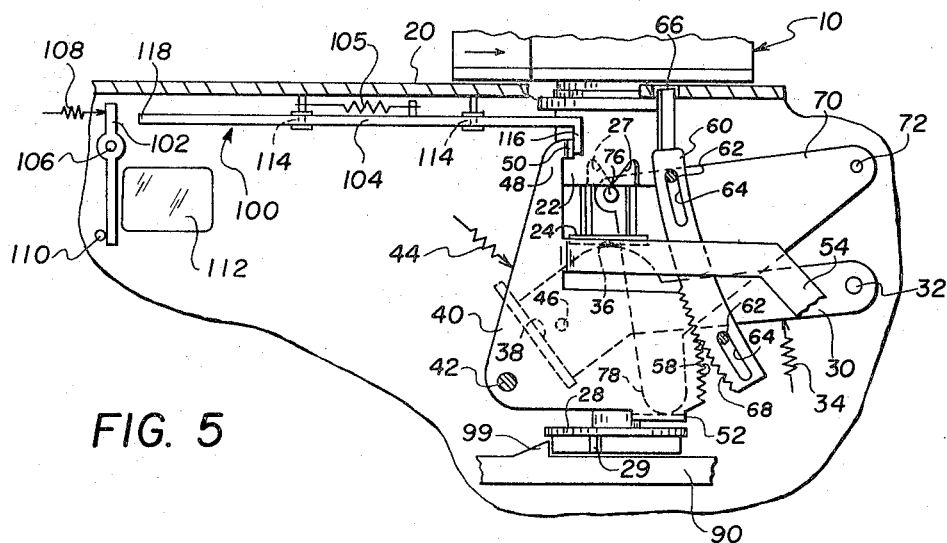
FIG. 5 illustrates withdrawal of the sensing member in response to manual rotation of the flash socket.
Figure 6:
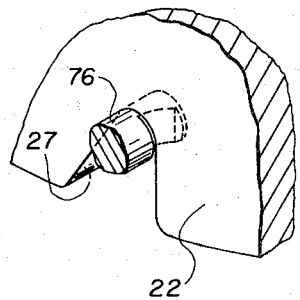
FIGS. 6 and 7 illustrate two views of the cam follower on the cam lever along with the cam surface located on the camera socket.
Figure 7:
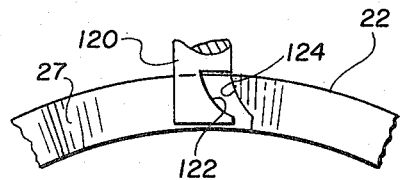

FIGS. 6 and 7 further illustrate the interaction of cam follower 76 and cam surface 27. Cam follower 76 includes a cam surface 120 and a generally triangular shaped cutout 122. Cam surface 27 includes a lip 124. Cutout 122 and lip 124 are designed to permit rotation of flash unit 10 in only one direction. When flash unit 10 is rotated in the direction illustrated in FIG. 5, cam surface 120 engages cam surface 27 and sensing and actuating slide 60 will be withdrawn from flash unit 10 as has been described hereinbefore. When the operator attempts to manually rotate flash unit 10 in the opposite direction, cutout 122 engages lip 124 and blocks movement of socket 22. Thus, the flash unit and socket may only be rotated in one direction.

This invention has been described in detail with particular reference to preferred embodiments thereof, but it will be understood that variations and modifications can be effections within the spirit and scope of the invention.

I claim:

1. For use with a flash unit having a plurality of flashlamps fireable by striking; a striker associated with each flashlamp and releasable from a pre-energized condition to effect such striking; and means defining an access opening providing access to such a pre-energized striker; photographic apparatus comprising:

means for receiving such a flash unit with one of the flashlamps located in a predetermined firing position relative to said photograhic apparatus;
means for rotating said receiving means to position another of the flashlamps at the predetermined firing position;
means, including a sensing member movable through an access opening in the flash unit, for sensing the presence or absence of a pre-energized striker associated with the flashlamp located at the predetermined firing position;
means responsive to movement of said sensing member for indicating the presence or absence of a pre-energized striker;
first withdrawing means for withdrawing said sensing member from the access opening in rsponse to rotation of said receiving means; and
second withdrawing means, responsive to operation of said rotating means, for withdrawing said sensing member from the access opening prior to its withdrawal by said first withdrawing means.

2. Photographic apparatus as in claim 1 wherein said second withdrawing means includes a withdrawing member movable into engagement with said sensing means to withdraw said sensing member in response to operation of said rotating means.

3. For use with a flash unit having a plurality of flashlamps fireable by striking; a striker associated with each flashlamp and releasable from a pre-energized condition to effect such striking; and means defining an access opening providing access to such a pre-energized striker; photographic apparatus comprising:

a socket for receiving such a flashlamp unit with one of the flashlamps located at a predetermined firing position relative to said photographic apparatus;
means for rotating said socket to position another of the flashlamps at the predetermined firing position;

a sensing member movable from a first position through an access opening to a second position in non-releasing contact with a pre-energized striker associated with the flashlamp at the predetermined firing position and further movable to an extended sensing position in the absence of a pre-energized striker;
means responsive to movement of said sensing member to said extended position for indicating the absence of a pre-energized striker;
first moving means coupled to said socket for moving said sensing member toward its first position and out of the access opening in response to rotation of said socket; and
second moving means coupled to said socket rotating means and responsive to operation thereof for moving said sensing member toward its first position prior to movement of said sensing member by said first moving means.

4. Photographic apparatus as in claim 3 wherein said second moving means includes a withdrawing member movable in response to operation of said socket rotating means to cause movement of said sensing member.

5. For use with a flash unit having a plurality of flashlamps fireable by striking; a striker associated with each flashlamp and releasable from a pre-energized condition to effect such striking; and means defining an access opening providing access to such a pre-energized striker; photographic apparatus comprising:

a rotatable socket for receiving such a flash unit with one of its flashlamps positioned in a predetermined firing position relative to the photographic apparatus;
means defining a cam surface movable with said socket;
means for rotating said socket to place another of the flashlamps at the predetermined firing position;
a sensing member, movable through an access opening of such a flash unit, for sensing the presence or absence of a pre-energized striker;
means responsive to movement of said sensing member for indicating the presence of a pre-energized striker;
follower means engageable by said cam surface for withdrawing said sensing member from the access opening in response to rotation of said socket; and means responsive to operation of said socket rotating means for withdrawing said sensing member from said access opening prior to engagement of said follower means by said cam surface.

6. Photographic apparatus as in claim 5 wherein said withdrawing means includes a withdrawing member movable in response to operation of said socket rotating means to cause movement of said sensing member.

7. For use with a flash unit having a plurality of flashlamps fireable by striking; a striker associated with each flashlamp and releasable from a pre-energized condition to effect such striking; and means defining an access opening providing access to such a pre-energized striker; photographic apparatus comprising:

a rotatable socket for receiving such a flash unit with one of the flashlamps located in a predetermined firing position relative to said photographic apparatus;
means for rotating said socket to position another of the flashlamps at the predetermined firing position;

a sensing member, movable through an access opening of such a flash unit, for sensing the presence or absence of a pre-energized striker;
means responsive to movement of said sensing member for indicating the presence or absence of a pre-energized striker;
first withdrawing means for withdrawing said sensing member from the access opening in response to rotation of said socket; and
second withdrawing means, including a withdrawing member engageable by said rotating means during operation, for withdrawing said sensing member from said access opening prior to its withdrawal by said first withdrawing means.

8. For use with a flash unit having a plurality of flashlamps fireable by striking; a striker associated with each flashlamp and releasable from a pre-energized condition to effect such striking; and means access an acces opening providing access to such a pre-energized striker; photographic apparatus comprising:

- a rotatable socket for receiving such a flash unit with one of the flashlamps located in a predetermined firing position relative to the photographic apparatus;
- means defining a cam surface movable with said socket;
- means for rotating said socket to position another of the flashlamps at the predetermined firing position;
- a sensing member movable from a first position through an access opening of such a flash unit to a second position in non-releasing contact with a pre-energized striker associated with the flashlamp at the predetermined firing position and further movable to an extended sensing position in the absence of a pre-energized striker;
- means responsive to movement of said sensing member to said extended position for indicating the absence of a striker in a pre-energized condition in association with the flashlamp at the predetermined firing position;
- follower means engageable by said cam surface during rotation of said socket for moving said sensing member toward its first position and out of the access opening; and
- means, including a movable withdrawing member engageable by said rotating means, for moving said sensing member toward its first position prior to engagement of said follower means by said cam surface.

9. For use with a flash unit having a plurality of flashlamps fireable by striking; a striker associated with each flashlamp and releasable from a pre-energized condition to effect such striking; and means defining an access opening providing access to such a pre-energized striker; photographic apparatus comprising:

- a rotatable socket for receiving such a flash unit with one of its flashlamps positioned in a predetermined firing position relative to the photographic apparatus;
- means defining a cam surface movable with said socket;
- a cam follower engageable by said cam surface during rotation of said socket;
- a sensing and firing member movable from a first position through an access opening of such a flash unit into a second position in non-releasing contact with a pre-energized striker associated with the flashlamp at said predetermined firing position and further movable to an extended position for sensing the absence of a pre-energized striker wire or for effecting release of a contacted pre-energized striker;
- means responsive to movement of said sensing and firing member to said extended position for indicating the absence of a pre-energized striker;
- means coupling said cam follower and said sensing and firing member for moving said sensing and firing member out of said access opening during rotation of said socket;
- an actuating member releasable from an energized position for effecting release of a pre-energized striker;
- means coupling said actuating member and said sensing and firing member for moving said sensinsg and firing member to said extended position in response to movement of said actuating member from said energized position and for moving said sensing and firing member out of the access opening during movement of said actuating member to its energized condition and prior to engagement of said cam follower with said cam surface; and
- means for rotating said socket to place another of the flashlamps at the predetermined firing position and for moving said actuating member to its energized position.

* * * * *

PO-1050
(5/69)

UNITED STATES PATENT OFFICE
CERTIFICATE OF CORRECTION

Patent No. 3,856,456      Dated December 24, 1974

Inventor(s)      David E. Beach

It is certified that error appears in the above-identified patent and that said Letters Patent are hereby corrected as shown below:

Column 7, line 23     "rsponse" should read --response--

Column 8, line 23     after "presence", insert --or absence--

Column 9, line 2     Delete "access" and substitute therefor --defining--

Column 9, line 3     "acces" should read --access--

Column 10, line 29     "sensinsg" should read --sensing--

Signed and sealed this 4th day of March 1975.

(SEAL)
Attest:

RUTH C. MASON
Attesting Officer

C. MARSHALL DANN
Commissioner of Patents
and Trademarks